(12) United States Patent
Lee et al.

(10) Patent No.: US 10,600,146 B2
(45) Date of Patent: Mar. 24, 2020

(54) SYMBOLOGY MONITORING SYSTEM

(71) Applicant: 2236008 Ontario Inc., Waterloo (CA)

(72) Inventors: Patrick Christopher Lee, Ottawa (CA); Christopher William Lewis Hobbs, Ottawa (CA)

(73) Assignee: 2236008 Ontario Inc., Waterloo, Ontario (CA)

(*) Notice: Subject to any disclaimer, the term of this patent is extended or adjusted under 35 U.S.C. 154(b) by 9 days.

(21) Appl. No.: 15/229,857

(22) Filed: Aug. 5, 2016

(65) Prior Publication Data

US 2018/0040099 A1    Feb. 8, 2018

(51) Int. Cl.
| | |
|---|---|
| G06K 9/00 | (2006.01) |
| G06T 1/60 | (2006.01) |
| G06K 9/03 | (2006.01) |
| G06K 9/62 | (2006.01) |
| B60K 37/02 | (2006.01) |
| G06T 1/20 | (2006.01) |
| G06T 7/00 | (2017.01) |
| G06F 11/16 | (2006.01) |

(52) U.S. Cl.
CPC ............... *G06T 1/60* (2013.01); *B60K 37/02* (2013.01); *G06K 9/036* (2013.01); *G06K 9/6202* (2013.01); *G06T 1/20* (2013.01); *G06T 7/0002* (2013.01); *B60K 2370/188* (2019.05); *B60K 2370/193* (2019.05); *G06F 11/1666* (2013.01); *G06K 2209/03* (2013.01); *G06K 2209/25* (2013.01); *G06T 2207/30168* (2013.01); *G06T 2207/30268* (2013.01)

(58) Field of Classification Search
CPC . G06T 2207/30252; G06T 2207/20221; G06T 7/13; G06T 7/74; G06T 7/70; G06T 15/00; G06K 9/6201; G06K 9/6211
See application file for complete search history.

(56) References Cited

U.S. PATENT DOCUMENTS

| | | | |
|---|---|---|---|
| 5,541,646 A | 7/1996 | Huang | |
| 6,327,388 B1 | 12/2001 | Zhou et al. | |
| 2003/0031356 A1 | 2/2003 | Sasa | |
| 2003/0100976 A1* | 5/2003 | Watanabe | G01C 21/3688 701/1 |
| 2006/0110043 A1 | 5/2006 | Reissman | |

(Continued)

OTHER PUBLICATIONS

Autonomous Driving approaches downtown., U. Franke, D. Gavrila et al., IEEE, 1999, pp. 1-14 (Year: 1999).*

(Continued)

*Primary Examiner* — Jayesh A Patel
(74) *Attorney, Agent, or Firm* — Rowland LLP

(57) ABSTRACT

A method automatically verifies information to ensure it is rendered correctly on a display screen. The method generates an electronic configuration file that controls the interactions between a graphics monitoring unit and a system application stored in an electronic memory. The method retrieves data stored in a portion of a display's memory that holds the content of a screen image to be rendered on the display screen and compares the data stored in a portion of a display's memory with second data provided by the system application to verify that the screen image is displayed on the display screen correctly. The method transmits the results of the comparison to the system application.

35 Claims, 6 Drawing Sheets

(56) References Cited

U.S. PATENT DOCUMENTS

| | | | |
|---|---|---|---|
| 2007/0294073 A1* | 12/2007 | Okamoto | B60K 35/00 703/20 |
| 2008/0013836 A1 | 1/2008 | Nakamura et al. | |
| 2016/0125269 A1 | 5/2016 | Lee et al. | |
| 2016/0275674 A1* | 9/2016 | Rivet-Sabourin | G06T 7/11 |
| 2017/0230556 A1* | 8/2017 | Bormet | H04N 5/2256 |
| 2018/0040114 A1* | 2/2018 | Stroupe | G06T 7/0002 |

OTHER PUBLICATIONS

European Search Report corresponding to EP Application No. 17185031.6 dated Nov. 22, 2017, 11 pages.
Tasnuva Tasneem et al.; Analysis of Edge Detection Technique by Varying Image Contrast; IOSR Journal of Electrical and Electronics Engineering; pp. 21-27, XP055609476, DOI: 10.9790/1676-09522127; Retreived from the Internet: URL:https:/pdfs.semanticscholar. org/3c8a/4c02f24c72296f87a0437f92a73b3749f090.pdf Jan. 1, 2014.
EPO, Communication pursuant to Article 94(3) EPC, relating to EP application No. 17185031.6 dated Aug. 8, 2019.

* cited by examiner

ABCDEFG
SYMBOLOGY MONITORING SYSTEM

BACKGROUND

Technical Field

This disclosure relates to systems that monitor the visual presentation of information including data that assures functional safety.

Related Art

Visual displays are being used in all types of systems and devices. These displays often use symbols to convey ideas and meaning. For example, vehicles display symbols on instrument clusters to inform drivers when the vehicle's parking brake is applied or when the vehicle's fluids are low.

In legacy systems, tungsten lamps are used to report faults or operating conditions. As electronic displays become more economical and more widely used, manufacturers are challenged to emulate the appearance of the legacy symbols that in the past were used on the older mechanical instrument clusters, and assure that the symbols shown on new electronic displays are defined correctly and operating correctly. In some instances, it is worse to display misleading symbols than to not report the faults or operating conditions.

Functional safety features will play a critical role in new systems and devices. When symbols warn of faults and conditions, and those faults affect safety, the systems must ensure that the symbols rendered and are rendered correctly.

BRIEF DESCRIPTION OF THE DRAWINGS

The system may be better understood with reference to the following drawings and description. The components in the figures are not necessarily to scale, emphasis instead being placed upon illustrating the principles of the disclosure. Moreover, in the figures, like referenced numerals designate corresponding parts throughout the different views.

Figure 1:
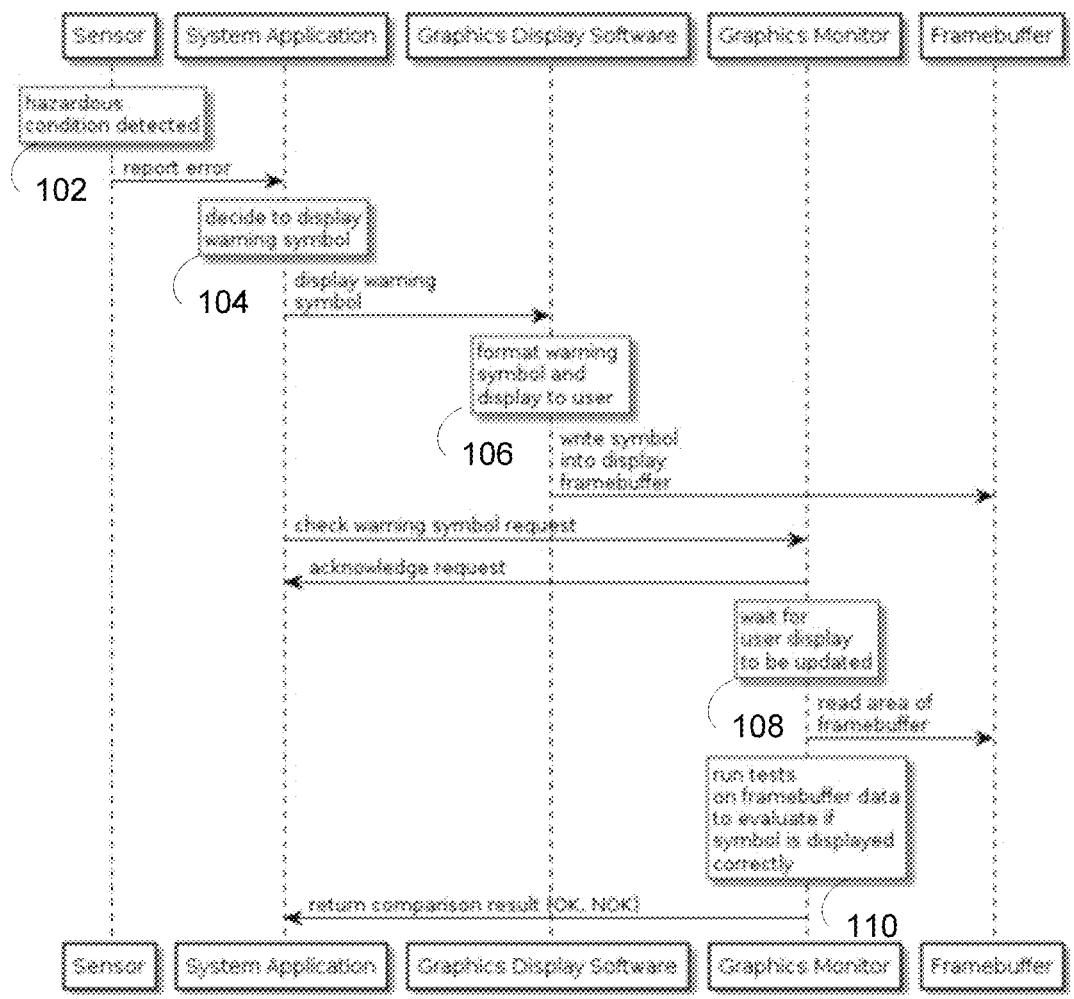
FIG. 1 is a process that validates symbology on a screen of a display unit.

Other systems, methods, features and advantages will be, or will become, apparent to one with skill in the art upon examination of the following figures and detailed description. It is intended that all such additional systems, methods, features and advantages be included with this description and be protected by the following claims.

DETAILED DESCRIPTION OF THE PREFERRED EMBODIMENTS

In the past, warning lights were functional or utilitarian. And, they were either operational or they weren't. In vehicles, when a user turns a key, older instrument clusters enter what is known as a test mode. The turn of the key causes the lights in the instrument cluster to illuminate immediately identifying all the systems and conditions that are monitored by illuminating a symbol. A key turn also alerts the driver to lamp failures. As instrument clusters evolve into graphic electronic displays and head-up displays, for example, emulating warning symbols presents challenges. The electronic displays must render the right symbol, using the right color, at the right time. A technical challenge of the disclosed systems is ensuring that the proper warning symbols are displayed at the right time, in some cases, using the right color, at the right location. Other technical challenges include ensuring (1) symbols that should not be rendered are not displayed; (2) that the symbols are displayed clearly (they are not rendered in a corrupt view); and/or (3) that the symbols are shown for the appropriate period of time without loading the electronics driving the electronic displays.

The disclosed systems (which also encompasses the disclosed processes and sometimes referred to as the symbology system) execute a combination of testing strategies on visual data or a bitmap that drives one or more video displays. By processing data retrieved from a collection of buffers that are used to render an electronic screen, the systems validate the output of subsystems and processes that monitor operating conditions that are rated for safety. In other words, the disclosed systems automatically ensure that the systems used to protect from danger, risk, or injury are functional and communicating with the driver or intended recipients correctly, for the proper duration (in some instances) and at the right time. In response to input from monitoring and analysis circuitry, the disclosed systems automatically process data in real time from a frame buffer or frame store that is retained in a portion of random access memory that is part of or interfaced to an electronic visual display through I/O circuitry. The memory contains a complete frame that directly drives the visual display and typically includes color values for every pixel (a point of an image that can be displayed) to be rendered on a display screen, a destination addresses, frame timing information, and is sufficient in size to satisfy the refresh rate of the display screen. A real time process is a process in which the symbology systems can update and process information at the same rate as it receives the data and operations that proceed as fast or faster than the same rate as a physical or external process is occurring. Real time operations are characteristic of vehicle guidance systems in self-driving vehicles, for example, in which the system responds to situations as they occur (for example, animating a graphic to report a condition as the condition is occurring or making corrections based on the output of an operating sensor as a measurement occurs).

Symbol validation may be assured by a combination of tests that may include summing data that makes up a portion of the stored or transmitted data intended for a selected region of a display screen, color coherency tests on selected pixels within a display screen region, and logically based and statically based tests. The automated processing includes the reduction of a retrieved display image to a grayscale, edge detection of the grayscale image, and the automated processing of the reduced and/or edge detection against data derived from expected images or symbols. Some implementations include one or more or any combination of a (1) a row edge pixel test; (2) a column edge pixel test; (3) total edge pixel test; (4) a row edge pixel frequency test; (5) a column edge pixel frequency test; (6) a cyclical redundancy test; and (7) selected color pixel validation tests, for example, that are executed in any order in response to the requesting application that can also determine/request the order.

Some implementations include tolerances that account for variances that may be caused by visual noise or visual corruption or inconsistency that is often undetected by human vision. The intelligence of the symbology systems automatically eliminates and in some systems, does not report test results that indicate that a particular condition or attribute is present. For example, when one pixel is a shade off (out of the millions of shades, for example) or if an entire image is shifted less than five pixels to the right or left, for example, the systems may log the difference in memory but may not report it because while the screen may not be technically perfect, the results are operating within the acceptable limits of variations in the visual domain. In addition to increasing utility by not reporting errors that users would normally disregard, the disclosed systems are versatile as some systems are retroactively integrated into existing software and hardware with minimal changes to the legacy systems; scale to most if not all monitoring technology that render images and symbology; and does not require segregation of checked and non checked symbology data busses. Further, the systems automatically adapt to different display resolutions, color depths, memory layouts, and refresh rate timings.

In operation, output from a monitoring or analysis circuitry report the existence or status of a particular condition by requesting that symbols be displayed or images be rendered on an electronic display screen when a safety condition is detected as reflected in 102 of FIG. 1. The request may identify the symbol, include a display screen destination address, and timing or time period data for rendering. When a system application issues a warning at 104 in response to a detected condition it communicates with graphics display software that is resident to or is a unitary part of the graphics monitor memory or accessed by a graphics processing unit via an input and output interface (I/O). In response to output of the system application software, the graphics processing unit executing the graphics display software writes the requested symbol into a display frame buffer (shown in FIG. 1) or a frame store that generates the display screen that is passed on pixel-by-pixel to the screen of the electronic display at 106. When issuing a warning, the system application will request that the symbology system confirm the rendering of the image or symbol on the display screen, which is thereafter acknowledged via a parallel circuit or interface that connects the symbology system to the system application and frame buffer or frame store. Following a predetermined time period such as two frame refresh cycles that may ensure that the entire screen data set has been written to the frame buffer or frame store and rendered on the display at 108, the symbology system samples the frame buffer or frame store and retrieves a portion of the content rendered on the display screen region that comprises the expected symbol or image and in some applications its attributes (such as an absolute or relative address). The selected portion of the screen data set may be sampled at predetermined time periods, at predetermined frequencies (e.g., polling the frame buffer or frame store at predetermined time periods to periodically determine status can be executed to determine duration), or may be sampled at a single instance. The symbology system processes the screen data to ensure that the symbols or images are being displayed and are being displayed correctly at 110. When the analysis is complete, the symbology system transmits the result of an event to the requesting system application regardless of the result. The event results will indicate the success or failure of rendering the symbol or image on the display screen. Based on the scope of the request of the requesting system application, the feedback data that comprise event may be pre-designated by the requesting system application or pre-programmed in a configuration file within a database coupled to the symbology system. In some alternative symbology systems the events may be contemporaneously created/generated in response to the request from the requesting system application. By always transmitting event results the symbology system is also providing a signal to the requesting application that the symbology system is operational.

Figure 2:
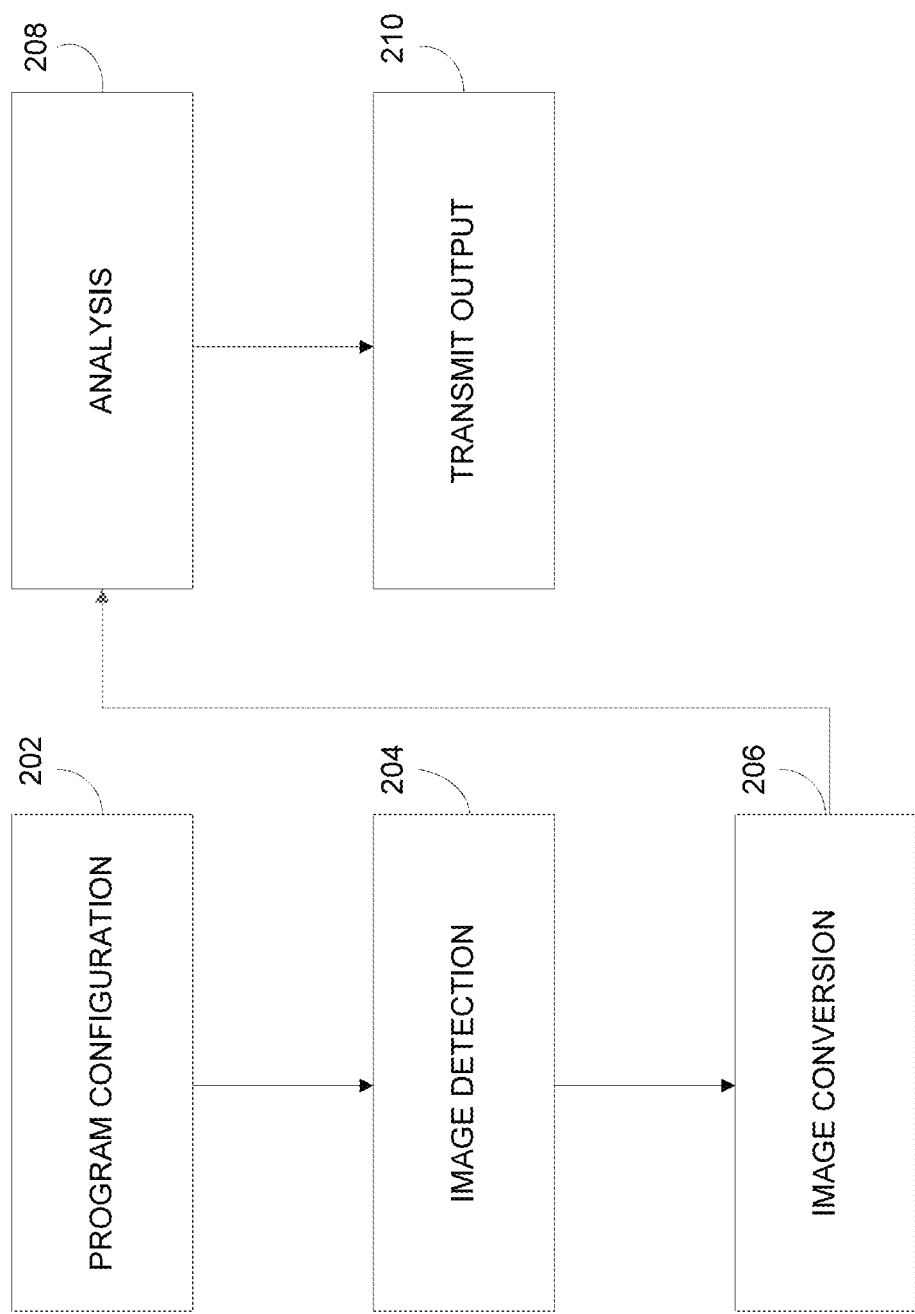
FIG. 2 is a second process that validates symbology on a screen of a display unit.

The process that validates symbology on a screen of a display unit is shown in FIG. 2. A structure that organizes data and governs the interactions between the logical units such as the system application stored in memory (shown as the system application in FIG. 1) and the symbology system (shown as the graphics monitor or graphics processing unit in FIG. 1) and the hosting communication systems is programmed in the configuration file as designated at 202. User configurable objects in the configuration file may include one or more aspects such the identity of the symbol or image to be detected and analyzed, the expected relative or absolute address on the display screen where the symbol or image should be found; the expected color and its corresponding spatial information on the display screen, the analysis being executed; the acceptable tolerance values or variation values with respect to symbol/image clarity, color coherence and/or location, and the feedback or event results requested in response to the test. As previously explained, some systems transmitted events at 210 that are dynamically generated or supplemented automatically in response to the analysis 208 in real time.

At optional step 208 the appearance of the symbol or image is assured through image queries that assure color fidelity. In the Red Green Blue (RGB) color-space, the system application requesting validation will provide the expected pixels, color, and absolute or relative locations on the screen for the symbol or images to be validated. The information may be pre-programmed in the configuration file or accompany the validation request. The process compares the data retrieved from the frame buffer or frame store with the data provided by the requesting system application using the spatial information to ensure a direct color match within the acceptable tolerance between the previously saved and retrieved symbols that are appropriately scaled to ensure the same pixel resolution or measure of color coherence in alternative processes. Color coherence reflects the degree to which the pixels of color are members of similarly positioned similarly colored regions of the display screen. If the pixels fall within a designated color bucket (a range of color shades pre-designated for a similarly colored region) they are designated coherent, if they fall outside of the color bucket they are designated incoherent.

A second optional test at step 208 will detect any changes in the expected and actual data through a cyclical redundancy test such as a thirty-two-bit cyclical redundancy test. The cyclical redundancy test generates a check sum of the Red Green and Blue components of all the retrieved symbol pixels and then compares the check sum against the expected checksum retained in the configuration file.

Figure 3:
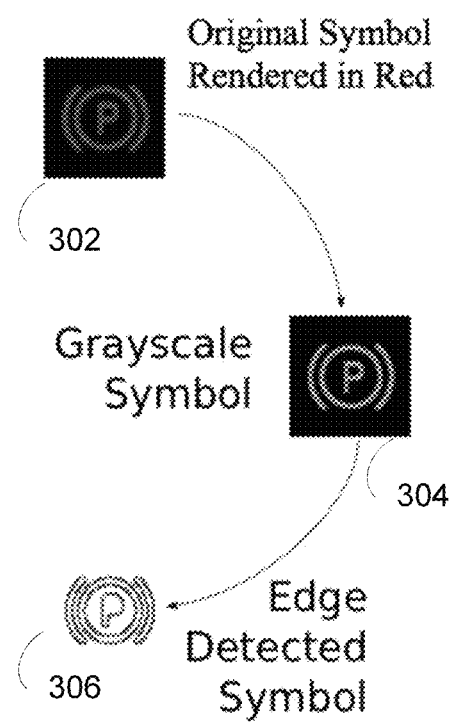
FIG. 3 is a transformation of symbol data.

At 206 the original symbol or image retrieved from the frame buffer or buffer store (shown as 302 in FIG. 3) are converted to a grayscale (shown as 304 in FIG. 3) by matching the luminance of the retrieved colored symbol or image from the frame buffer or frame store to a weighted predestinated luminance of a grayscale stored in a database. By replication of the tones and variations, the symbol or image is converted into a range of gray without apparent color as shown in FIG. 3.

An edge detection process, such as a Canny edge detection, is then executed by the symbology system that removes noise and detects edges at 208. The resulting image is a two dimensional model rendered on a grid of the same dimension and edge information as the original symbol or image retrieved from the frame buffer or frame store with just edge information remaining (an exemplary edge detected symbol is shown as 306 in FIG. 3). The pixels that are attributed to the edge are made black while the non-edge pixels are made white.

Once reduced to a two-dimensional edge based image model having the same dimension as the received symbol or image, the number of pixels that make up the columns of the grid of the sampled symbol or image may be processed at a third optional test at 208. Through an automated comparison of the actual column count data of the image model against the expected column count data on a column-by-column basis, the symbology system automatically determines the level of similarity between the image model and expected symbol or images. If the column counts are equal or within acceptable tolerances the retrieved symbol or images are validated under this test. In other words, the system will have determined that there is little or no horizontal placement corruption or other distortions causing edges to appear or disappear within the image.

A fourth optional test may be automatically executed on a row-by-row basis at 208 like the column edge pixel test to detect vertical placement corruption. In this test, the system compares actual row count data of the image model against the expected row count data on a row-by-row basis. Through a second automated comparison of the actual row count data of the image model against the expected column count data on a column-by-column basis, the symbology system automatically determines the level of similarity between the model and expected symbol or images. If the rows counts are equal or within acceptable tolerances the symbol or images are validated under this test.

A fifth optional test may be automatically executed by comparing the total number of pixels of the image model and expected total number of pixel counts at 208. If the total number of edges pixels present in the image model is the same or within acceptable tolerances as the expected total count the retrieved symbol or images are validated under this test.

A sixth optional test may be automatically executed by statistically analysing two data sets through a Chi squared calculation at 208. In this test the frequency of the column edge of the image model is compared against the expected frequency of the column edge to determining if images could have originated from the same source. The closer the results are aligned, and thus share a common source, the closer the result is to the unity value or one. When applying a predetermined tolerance through a multiplier, such as ninety percent, for example, when the result is 0.9 or greater (e.g., 1×0.9=0.9), the retrieved symbol or images are validated under this test. The seventh optional test is similar to the sixth optional test, except that the frequency of the column edge of the image model is compared against the expected frequency of the column edge following the same process described above.

Once the retrieved symbol or image and/or the reduced two-dimensional edge based image model are analyzed, the symbology system transmits the event results of the test to the requesting system application. The data that comprise the event results may be pre-programmed by the requesting system application or pre-programmed by a user in the configuration file. In some alternative symbology systems, the events may be dynamically generated (not preprogrammed) and transmitted in real time as each requested test is completed or in batch meaning all the scheduled or requested event results are transmitted in a single transmission run when all of the requested tests are completed.

Figure 4:
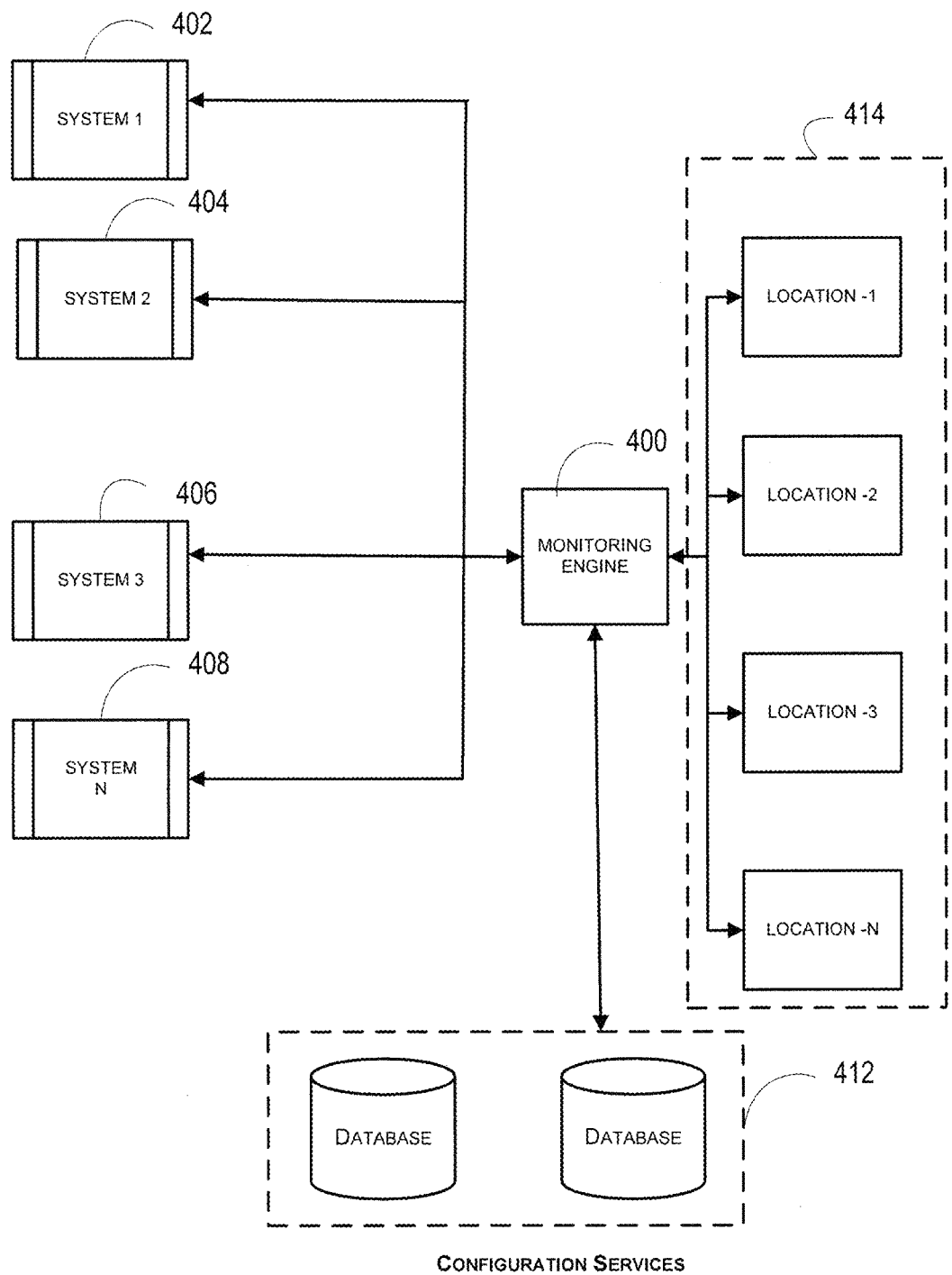
FIG. 4 is a monitoring engine interfaced to input systems and a display unit.

In FIG. 4 the symbology system comprises a monitoring engine 400 and configuration services are served by a local or a remote distributed database 412. The monitoring engine contains or accesses the tools and tests for validating the retrieved symbol or image and/or the reduced two-dimensional image model via the processes described. The monitoring and analysis circuitry shown as systems 402-408 automatically notifies the monitoring engine 400 of faults, warning conditions, or operating conditions as they occur which is then stored in the configuration services 416 in real time. In response, the monitoring engine 400 automatically monitors regions of the display screen 414 shown as locations by executing one or more of the tests described and temporarily stores the results in the configuration services 416. The event results can be read by the monitoring engine 400 and transmitted to the requesting system 402-408 or transmitted to a proxy system or software. A proxy system or software may mediate the communication between the systems 402-408 and the monitoring engine 400 if the monitoring engine 400 is not in direct communication with the requesting systems 402-408.

Figure 5:
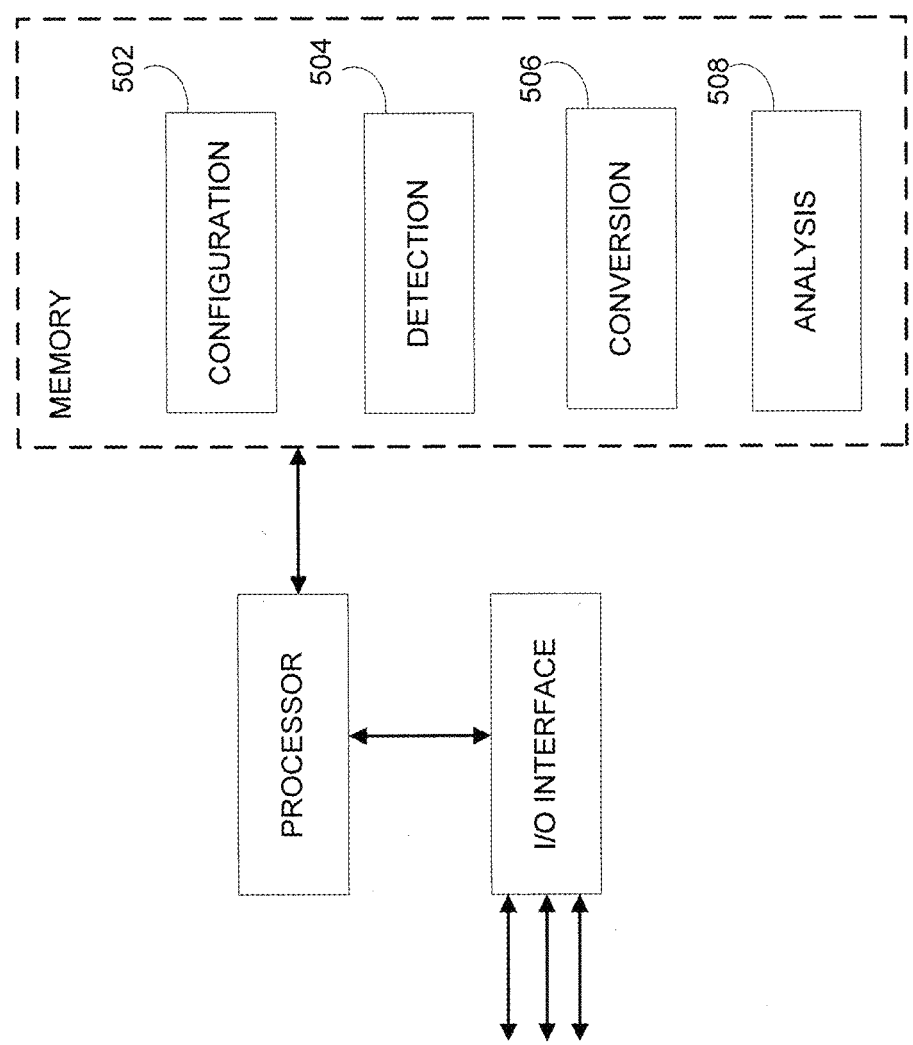
FIG. 5 is a symbology system.

The methods, devices, systems, and logic described above may be implemented in many other ways in many different combinations of hardware, software or both hardware and software and may be used to compare, contrast, and visually display objects. All or parts of the system may be executed through one or more specifically programmed controllers, one or more specifically programmed microprocessors (CPUs), one or more specifically programmed signal processors (SPU), one or more specifically programmed graphics processors (GPUs), one or more application specific integrated circuit (ASIC), one or more programmable media or any and all combinations of such hardware including the hardware shown in FIGS. 4-6. All or part of the logic described above including that shown in FIGS. 1-3 may be implemented as unique instructions for execution by a microcontroller that comprises electronics including input/output interfaces, a microprocessor, and an up-dateable memory comprising at least a random access memory which is capable of being updated via an electronic medium and which is capable of storing updated information, processors (e.g., CPUs, SPUs, and/or GPUs), controller, an integrated circuit that includes a microcontroller on a single chip or other processing devices and may be displayed through a display driver in communication with a remote or local display, or stored and accessible from a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk as shown in program modules 502-508 of FIG. 5. Thus, a product, such as a computer program product, includes a specifically programmed storage medium and computer readable instructions stored on that medium, which when executed, cause the device to perform the specially programmed operations according to the descriptions above.

Figure 6:
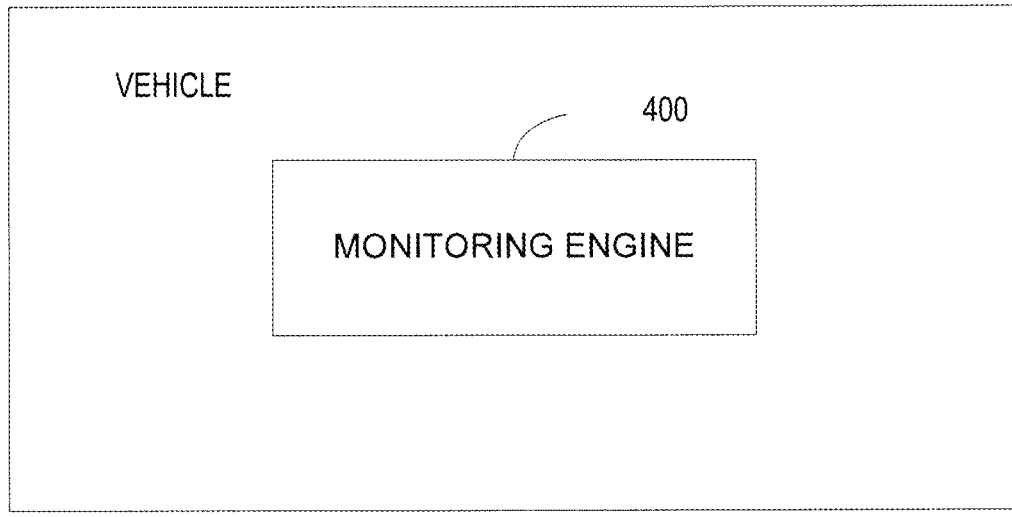
FIG. 6 is monitoring engine in a vehicle and a display
Figure 6:
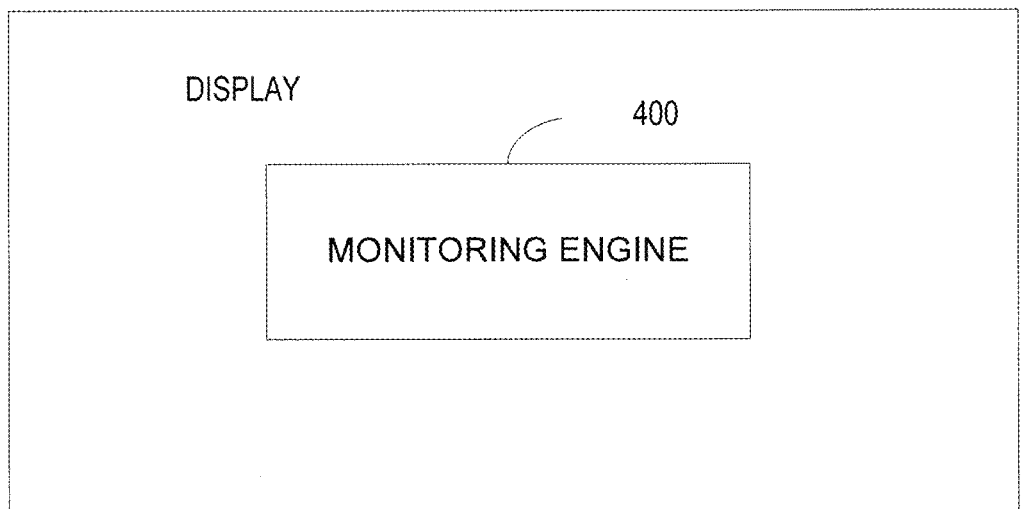

The systems may evaluate warning symbols being used in any equipment including electronic displays and/or heads-up displays as shown in FIG. 6 and may render operational controls that operate under functional safety parameters that adhere to safety standards such as ISO 26262, IEC 61508, and IEC 62304. Parameters, databases, software, filters and data structures used to evaluate and analyze the symbols or images to be rendered may be separately stored in memory and may be executed by the processors. It may be incorporated into a single memory block or database, may be logically and/or physically organized in many different ways, and may be implemented in many ways. The programming executed by the symbology systems may be parts (e.g., subroutines) of a single program, separate programs, application program or programs distributed across several memories and processor cores and/or processing nodes, or implemented in many different ways, such as in a library or a shared library accessed through a specifically programmed client server architecture through a local tangible or wireless network. The library may store the configuration file and the software code that performs any of the system processing described herein, and the scratch pad used by the graphical processing unit. The processing steps described may be performed sequentially or concurrently in parallel without user intervention, meaning the processor may execute the next test before the prior test is completed in a continuous and/or autonomous manner. When the system is operating autonomously, it operates independently of the requesting device or system and does not incorporate the requesting device or system's functionality. Further, the testing cycle can include any combination of the test described, meaning each of the tests is optional and may be performed in any order or combination and may be supplemented or replaced by other display screen tests. While various embodiments have been described, it will be apparent to those of ordinary skill in the art that many more embodiments and implementations are encompassed in this disclosure.

The term "coupled" disclosed in this description may encompass both direct and indirect coupling. Thus, first and second parts are said to be coupled together when they directly contact one another, as well as when the first part couples to an intermediate part which couples either directly or via one or more additional intermediate parts to the second part. The term "substantially" or "about" may encompass a range that is largely, but not necessarily wholly, that which is specified. It encompasses all but a significant amount. When devices are responsive to commands events and/or requests, or occur in response to something, the actions and/or steps of the devices, such as the operations that devices are performing, necessarily occur as a direct or indirect result of the preceding commands, events, actions, and/or requests. In other words, the operations occur as a result of the preceding operations. A device that is responsive to another requires more than an action (i.e., the device's response to) merely follow another action.

The subject-matter of the disclosure also relate, among others, to the following aspects:

Claim 1. A method of automatically verifying that information is rendered correctly on a display screen comprising:
generating an electronic configuration file that controls the interactions between a graphics monitoring unit and a system application stored in a memory;
retrieving data stored in a portion of a display's memory that holds the content of a screen image to be rendered on a display screen automatically and comparing the data stored in a portion of a display's memory with second data provided by the system application to verify that the screen image is correctly displayed in an area of the display screen specified by the system application automatically; and
transmitting the results of the comparison to the system application automatically.

Claim 2: The method of claim 1 where the electronic configuration file comprises configurable objects.

Claim 3: The method of claim 2 where the configurable objects identify the screen image being verified, an address on the display screen where the screen image should be found, and an expected color of the screen image and corresponding spatial image of the expected color.

Claim 4: The method of claims 2 to 3 where the configurable objects comprise a plurality of tests to be executed by the comparison.

Claim 5: The method of claims 2 to 4 where the configurable objects comprise a plurality of tolerance values for the screen image with respect to screen image clarity, screen image color coherence and screen image location on the display screen.

Claim 6: The method of claims 1 to 5 where the results are generated dynamically in response to a request transmitted from the system application.

Claim 7: The method of claims 1 to 6 where the acts of:
retrieving the data stored in the portion of the display's memory that holds the content of the screen image to be rendered on the display screen and comparing the data with the second data provided by the system application to verify that the screen image is correctly displayed in the area of the display screen specified by the system application stored in the memory; and the act of
transmitting the results of the comparison to the system application occurs automatically and in real time in response to a request transmitted by the system application to the graphics monitoring unit.

Claim 8: The method of claims 1 to 7 where the display's memory comprises a frame store remote from the display screen.

Claim 9: The method of claims 1 to 8 where the data stored in the portion of a display's memory is transmitted by the system application to the display's memory.

Claim 10: The method of claims 1 to 9 where comparing the data stored in the portion of the display's memory with the second data provided by the system application compares the screen image's color fidelity.

Claim 11: The method of claims 1 to 10 where comparing the data stored in the portion of the display's memory with the second data provided by the system application compares the screen image's color coherency.

Claim 12: The method of claims 1 to 11 where comparing the data stored in the portion of the display's memory with the second data provided by the system application executes a cyclical redundancy test of the red, blue, and green components of the screen image.

Claim 13: The method of claims 1 to 12 where the data stored in a portion of the display's memory is further processed to remove any color associations.

Claim 14: The method of claims 1 to 13 and where the act of comparing the data stored in the portion of the display's memory with the second data provided by the system application executes two or more of a row edge pixel test, column edge pixel test, total edge pixel test, a row edge pixel frequency test, a column edge pixel frequency test, a cyclical redundancy test, and a color pixel validation test.

Claim 15: A system that automatically verifies information is visually rendered correctly on a display screen comprising:
an input and an output circuit that inputs and outputs data to a monitoring and analysis circuit; and
a processor programmed to process data and execute software stored in a non-transitory computer-readable medium that stores a configuration file that controls the interactions between the processor and a system application; the software enables the processor to retrieve data stored in a portion of a display's memory remote from the non-transitory computer-readable medium, the display's memory stores content comprising a screen image to be rendered on a display screen and software that compares the data stored in a portion of the display's memory with second data provided by the system application to verify that a screen image is correctly displayed on the display screen.

Claim 16: The system of claim 15 further comprising graphic display software stored in a second memory remote from the display's memory, when executed by the processor the graphic display software writes a representation of a visual symbol into the display's memory.

Claim 17: The system of claims 15 to 16 where the display's memory comprises a frame store.

Claim 18: The system of claims 15 to 17 where the processor is programmed to execute three or more of a row edge pixel test, a column edge pixel test, a total edge pixel test, a row edge pixel frequency test, a column edge pixel frequency test, a cyclical redundancy test, and a color pixel validation test.

Claim 19: The system of claims 15 to 18 where the processor comprises a graphic processing unit.

Claim 20: The system of claims 15 to 19 where the input and an output circuit, the processor, and the non-transitory computer-readable medium is integrated within a vehicle.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method of automatically verifying that information is rendered correctly on a display screen during vehicle operation, the method comprising:
   generating an electronic configuration file that controls the interactions between a graphics monitoring unit and a system application stored in a memory;
   receiving a request including time period data to confirm that a screen image is rendered correctly on the display screen during a specified time period associated with the time period data and, in response, analysing the screen image at two or more instances during the specified time period by, in each instance,
      retrieving data stored in a portion of a display's memory that holds content of the screen image to be rendered automatically, wherein the screen image indicates a reportable vehicle condition based on an operating sensor output, and wherein the screen image is a subset portion of a total image displayed on the display screen,
      reducing the screen image to a grayscale image, and
      comparing data that renders the grayscale image with second data provided by the system application to verify that the screen image is correctly displayed in an area of the display screen during that instance of the specified time period specified by the system application automatically;
   determining that the screen image is correctly displayed during each of the two or more instances over the specified time period; and
   transmitting the results of the comparison associated with the specified time period to the system application automatically.

2. The method of claim 1 where the electronic configuration file comprises configurable objects.

3. The method of claim 2 where the configurable objects identify the screen image being verified, an address on the display screen where the screen image should be found, and an expected color of the screen image and corresponding spatial image of the expected color.

4. The method of claim 2 where the configurable objects comprise a plurality of tests to be executed by the comparison.

5. The method of claim 2 where the configurable objects comprise a plurality of tolerance values for the screen image with respect to screen image clarity, screen image color coherence and screen image location on the display screen.

6. The method of claim 1 where the results are generated dynamically in response to a request transmitted from the system application.

7. The method of claim 1 where the acts of:
   retrieving the data stored in the portion of the display's memory that holds the content of the screen image to be rendered on the display screen and comparing the data that renders the grayscale image with the second data provided by the system application to verify that the screen image is correctly displayed in the area of the display screen during the specified time period specified by the system application stored in the memory; and the act of
   transmitting the results of the comparison associated with the specified time to the system application occurs automatically and in real time in response to the request transmitted by the system application to the graphics monitoring unit.

8. The method of claim 1 where the display's memory comprises a frame store remote from the display screen.

9. The method of claim 1 where the data stored in the portion of a display's memory is transmitted by the system application to the display's memory.

10. The method of claim 1 where comparing the data stored in the portion of the display's memory with the second data provided by the system application compares the screen image's color fidelity.

11. The method of claim 1 where comparing the data that renders the reduced image with the second data provided by the system application compares the screen image's coherency.

12. The method of claim 1 where the data stored in a portion of the display's memory is further processed to remove data that renders color in the screen image.

13. The method of claim 1 where the act of comparing the data that renders the reduced image with the second data provided by the system application executes two or more of a row edge pixel test, a column edge pixel test, a total edge pixel test, a row edge pixel frequency test, a column edge pixel frequency test, a cyclical redundancy test, and a color pixel validation test.

14. A method of automatically verifying that information is rendered correctly on a display screen comprising:
   generating an electronic configuration file that controls the interactions between a graphics monitoring unit and a system application stored in a memory;
   retrieving data stored in a portion of a display's memory that holds the content of a screen image to be rendered on a display screen automatically and comparing the data stored in the portion of the display's memory with second data provided by the system application to verify that the screen image is correctly displayed in an area of the display screen specified by the system application automatically; and transmitting the results of the comparison to the system application automatically;

wherein comparing the data stored in the portion of the display's memory with the second data provided by the system application includes comparing a check sum of red, blue, and green components of pixels of the screen image with a check sum of red, blue, and green components of pixels of an expected image of the second data.

15. The method of claim 14 where the electronic configuration file comprises configurable objects.

16. The method of claim 14 where the configurable objects identify the screen image being verified and an address on the display screen where the screen image should be found.

17. The method of claim 14 where the configurable objects comprise a plurality of tests to be executed by the comparison.

18. The method of claim 14 where the configurable objects comprise a plurality of tolerance values for the screen image with respect to screen image clarity.

19. The method of claim 14 where the results are generated dynamically in response to a request transmitted from the system application.

20. The method of claim 14 where the acts of:
retrieving the data stored in the portion of the display's memory that holds the content of the screen image to be rendered on the display screen and comparing the data with the second data provided by the system application to verify that the screen image is correctly displayed in the area of the display screen specified by the system application stored in the memory; and the act of transmitting the results of the comparison to the system application occurs automatically and in real time in response to a request transmitted by the system application to the graphics monitoring unit.

21. The method of claim 14 where the display's memory comprises a frame store remote from the display screen.

22. The method of claim 14 where the data stored in the portion of a display's memory is transmitted by the system application to the display's memory.

23. The method of claim 14 where the act of comparing the data stored in the portion of the display's memory with the second data provided by the system application executes a row edge pixel test.

24. The method of claim 14 where the act of comparing the data stored in the portion of the display's memory with the second data provided by the system application executes a column edge pixel test.

25. The method of claim 14 where the act of comparing the data stored in the portion of the display's memory with the second data provided by the system application executes a total edge pixel test.

26. The method of claim 14 where the act of comparing the data stored in the portion of the display's memory with the second data provided by the system application executes a row edge pixel frequency test.

27. The method of claim 14 where the act of comparing the data stored in the portion of the display's memory with the second data provided by the system application executes a column edge pixel frequency test.

28. The method of claim 14 where the act of comparing the data stored in the portion of the display's memory with the second data provided by the system application executes a color pixel validation test.

29. A system that automatically verifies information is visually rendered correctly on a display screen during vehicle operation, the system comprising:
an input and an output circuit that inputs and outputs data to a monitoring and analysis circuit; and a processor programmed to process data and execute software stored in a non-transitory computer-readable medium that stores a configuration file that controls the interactions between the processor and a system application;

the software enables the processor to receive a request including time period data to confirm that a screen image is rendered correctly on the display screen during a specified time period associated with the time period data and, in response, analyse the screen image at two or more instances during the specified time period by, in each instance retrieving data stored in a portion of a display's memory remote from the non-transitory computer-readable medium, the display's memory stores content comprising the screen image to be rendered on the display screen, wherein the screen image indicates a reportable vehicle condition based on an operating sensor output, and wherein the screen image is a subset portion of a total image displayed on the display screen, reducing the screen image to a grayscale image using weighted luminance values corresponding to luminance values of the screen image, and comparing the data that renders the grayscale image with second data provided by the system application to verify that the screen image is correctly displayed on the display screen during that instance of the specified time period;

wherein the software determines that the screen image is correctly displayed during each of the two or more instances over the time period; and wherein the software transmits the results of the comparison associated with the specified time period to the system application automatically.

30. The system of claim 29 further comprising graphic display software stored in a second memory remote from the display's memory, when executed by the processor the graphic display software writes a representation of a visual symbol into the display's memory.

31. The system of claim 29 where the display's memory comprises a frame store.

32. The system of claim 29 where the processor is programmed to execute three or more of a row edge pixel test, a column edge pixel test, a total edge pixel test, a row edge pixel frequency test, a column edge pixel frequency test, a cyclical redundancy test, and a color pixel validation test.

33. The system of claim 29 where the processor comprises a graphic processing unit.

34. The system of claim 29 where the input and an output circuit, the processor, and the non-transitory computer-readable medium is integrated within a vehicle.

35. A non-transitory computer-readable medium having stored thereon software instructions that, when executed by a processor, cause the processor to:
generate an electronic configuration file that controls the interactions between a graphics monitoring unit and a system application stored in a memory;

retrieve data stored in a portion of a display's memory that holds the content of a screen image to be rendered on a display screen automatically and comparing the data stored in the portion of the display's memory with second data provided by the system application to verify that the screen image is correctly displayed in an area of the display screen specified by the system application automatically; and transmit the results of the comparison to the system application automatically;

wherein comparing the data stored in the portion of the display's memory with the second data provided by the system application includes comparing a check sum of red, blue, and green components of pixels of the screen image with a check sum of red, blue, and green components of pixels of an expected image of the second data.

\* \* \* \* \*